United States Patent [19]
Tammisalo

[11] Patent Number: 5,704,406
[45] Date of Patent: Jan. 6, 1998

[54] COMBINED HARVESTING AND TRANSPORTING MACHINE

[76] Inventor: Toivo Tammisalo, Tevantotie 25 FIN-12750, Pilpala, Finland

[21] Appl. No.: 581,592

[22] PCT Filed: May 31, 1994

[86] PCT No.: PCT/FI94/00224

§ 371 Date: Aug. 30, 1996

§ 102(e) Date: Aug. 30, 1996

[87] PCT Pub. No.: WO95/01093

PCT Pub. Date: Jan. 12, 1995

[30] Foreign Application Priority Data

Jun. 30, 1993 [FI] Finland ................................. 933003

[51] Int. Cl.$^6$ ................................................ A01G 23/08
[52] U.S. Cl. ................................................ 144/4.1; 144/335
[58] Field of Search ................................. 144/4.1, 24.13, 144/34.1, 34.5, 335, 336, 339; 414/426, 799

[56] References Cited

U.S. PATENT DOCUMENTS

| | | | |
|---|---|---|---|
| 4,911,215 | 3/1990 | Phipps | 144/4.1 |
| 5,109,900 | 5/1992 | Gilbert | 144/4.1 |
| 5,390,715 | 2/1995 | Luscombe | 144/4.1 |

*Primary Examiner*—W. Donald Bray
*Attorney, Agent, or Firm*—Reese Taylor

[57] ABSTRACT

A combined harvesting and transporting forestry machine includes a multi-directional pivotable and extensible boom assembly (1) having a crosswise jib (2) fitted at its outermost end. A clamp harvester (4) is carried by one end of the crosswise jib (2). A loading gripper (3) is carried by the other end of the crosswise jib (2). The crosswise jib (2) is adapted to pivot about an axle (8) such that either tool (3,4) may be moved to a working position.

9 Claims, 3 Drawing Sheets

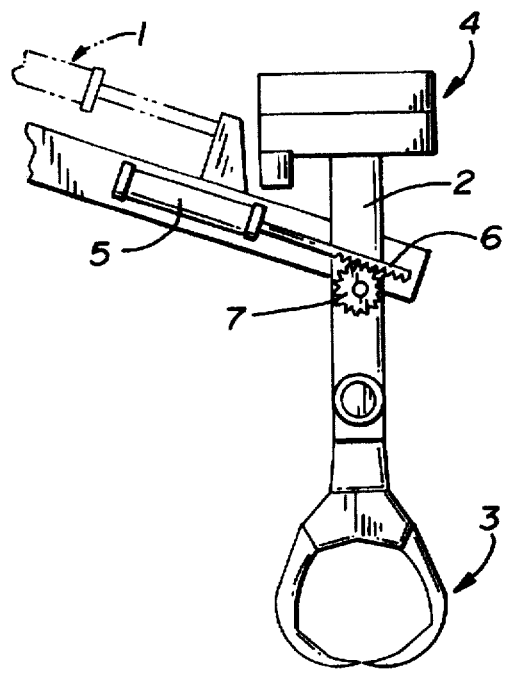
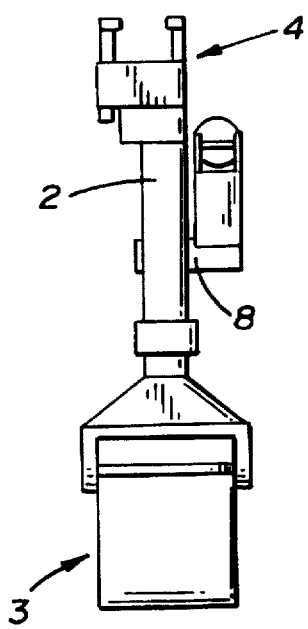
FIG. 2　　　　FIG. 3
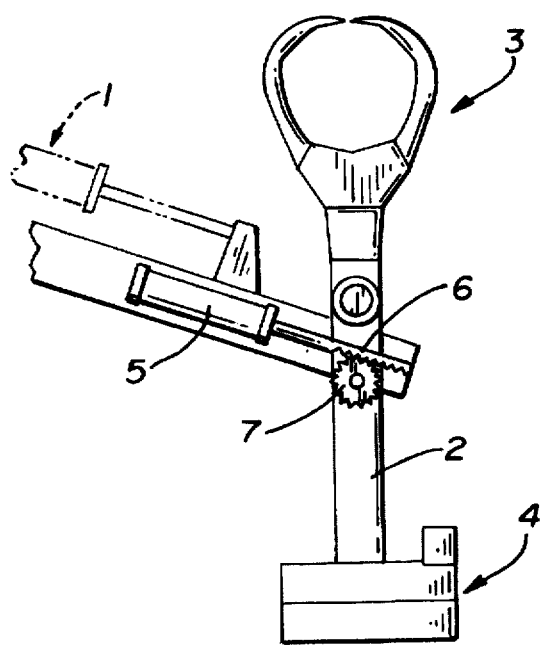
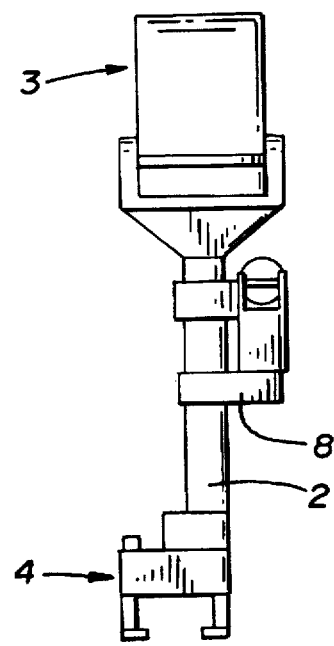
FIG. 4　　　　FIG. 5

U.S. Patent  Jan. 6, 1998  Sheet 3 of 3  5,704,406
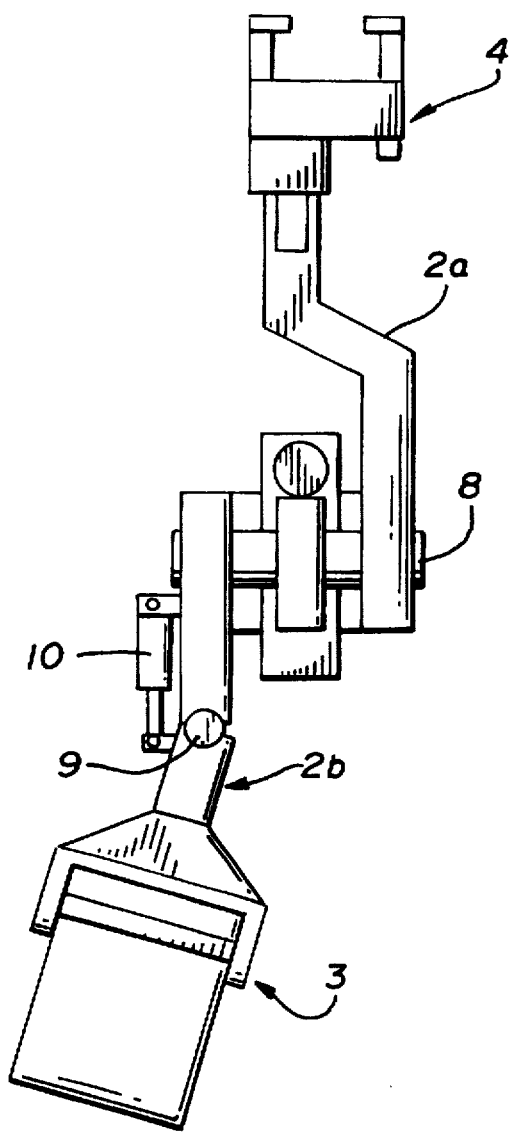
F I G. 6
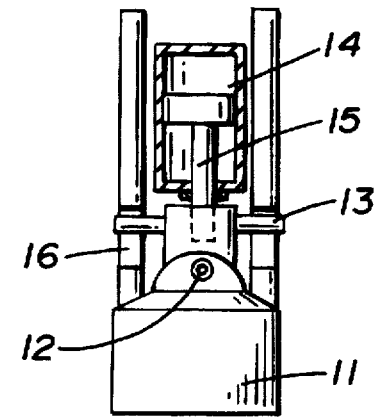
F I G. 7
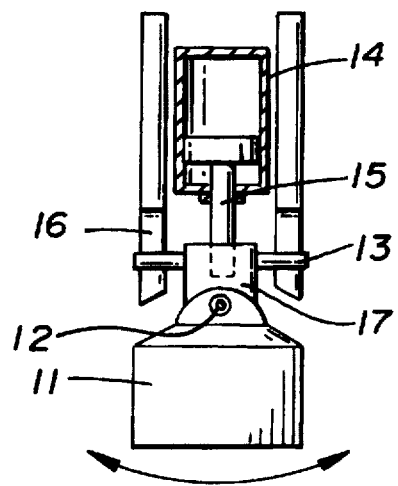
F I G. 8

COMBINED HARVESTING AND TRANSPORTING MACHINE

The present invention relates to combining the actions of a harvesting machine and a transporting machine in a single machine.

The invention is based on the fact that the current machine stock is primarily suitable for clear cutting and even for that it is needlessly expensive. Normally, the cutting or logging operations are performed by using a separate cutting or harvesting machine, whose price can be e.g. about 1,5–2 million Finnish marks, and also by using a separate transporting machine which generally costs over 1 million Finnish marks and, thus, such a combination of machines costing nearly 3 million Finnish marks is not particularly feasible for economical thinning operations and, when the combination has been used for this type of thinning work, the remaining trees have suffered damage. Hence, an object of the present invention is to provide a novel type of forestry machine, whose primary application concerns thinning operations but which is naturally useful for other cutting operations as well. A novel type of machine of the invention is particularly suitable for the cooperation between a logger and a machine operator, wherein the logger leads the way felling and cutting the heavy trees and the machine is used for lopping and cutting the tops and for picking up the cut timber to be carried away by the transporting machine. Such a combination is even economically sound as the cutting by manual labour produces quality logs and results in a more through exploitation of timber. In addition, the logging as manual labour is relatively inexpensive, e.g. about FIM 20,-/solid meter, while the production of spruce pulp as manual labour incurs about treble costs.

A novel forestry machine of the invention is characterized by what is set forth in the characterizing section of claim 1.

The invention will now be described with reference made to the accompanying drawings, in which:

FIGS. 2, 3, 4 and 5 show a schematic side view and frontal view, respectively, of a detail according to one embodiment of the invention in two different operating positions.

FIG. 6 is a schematic frontal view showing a detail in another embodiment of the invention, and FIGS. 7 and 8 show schematically another detail of the invention.

Figure 1:
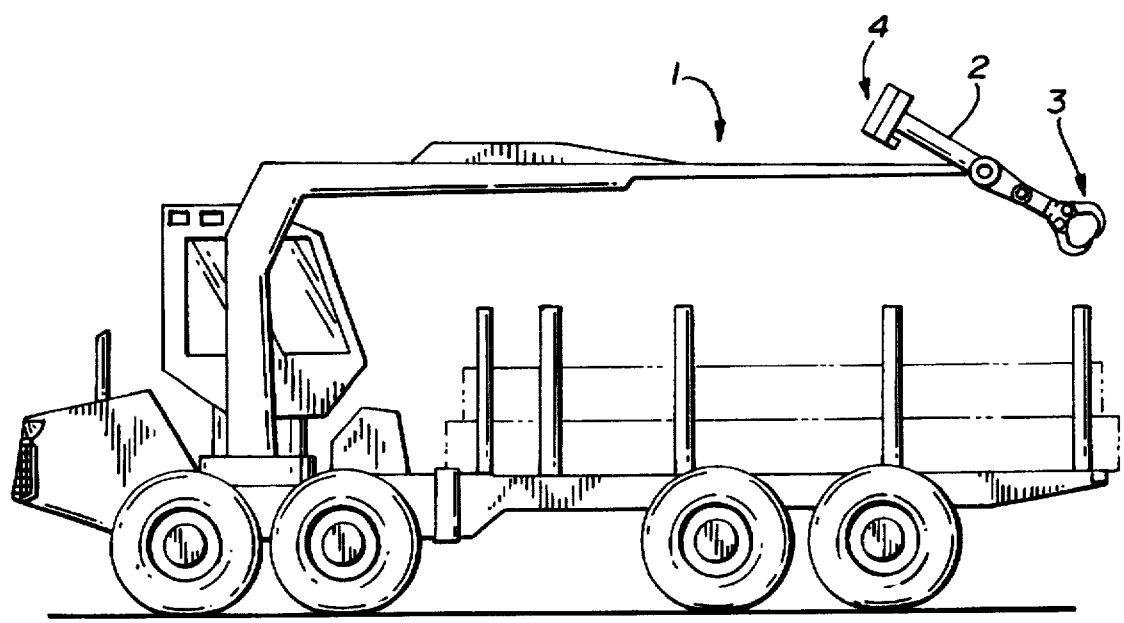
FIG. 1 shows a schematic exemplary view of one transporting machine suitable for carrying timber and adaptable to practicing the present invention.

As shown in FIGS. 1 through 5 of the invention includes a conventional boom assembly 1 having its outer end fitted with a crosswise jib 2. One end of the crosswise jib 2 is provided with a clamp harvester 4 and the other end with a loading gripper 3. The crosswise jib 2 is adapted to pivot in its longitudinal direction around an axle 8 for turning either one of the ends 3 or 4 to a working position, as required.

FIGS. 2 through 5 illustrate in more detail a linkage between the crossarm 2 and the rest of the boom assembly 1. In FIG. 2 and 3 the crosswise jib is shown in a side view and in an end view from the outermost end of the boom assembly with the loading gripper in its lower operating position. Respectively, FIG. 3 illustrates the clamp harvester 4 in its lower operating position. Naturally, these operating positions are just examples and the jib 2 can be locked in any desired pivoted position, for example in a position forming a substantially longitudinal extension for the rest of the boom assembly 1 for providing a maximum reach. The crosswise jib 2 is adapted to pivot around the axle 8. This pivoting action can be effected e.g. by means of a hydraulic cylinder 5 and associated gear rack 6 fitted inside the boom assembly 1, said gear rack 6 being in cooperation with a gear 7 mounted on the axle 8, whereby the shifting of said gear rack 6 forward or backward rotates the axle 8 and the crosswise jib 2 mounted thereon. The axle 8 is journalled to the boom assembly 1. This pivoting action of the jib 2 can naturally be effected in many other ways known as such to a person skilled in the art. In view of practical operation, it is also preferred that the clamp harvester 4 and/or the loading gripper 3 be provided with locking means for locking the same rigidly to the crosswise jib 2 whenever necessary. Such a locking means may comprise e.g. a hydraulically operated locking cone, one embodiment of which will described in more detail hereinbelow in conjunction with FIGS. 5a and 5. Naturally also other locking means known as such to a skilled person can be used for locking the loading gripper and the clamp harvester rigidly to the crosswise jib.

The clamp harvester 4 and loading gripper 3 mounted on the end of the crosswise jib 2 are further equipped with usually hydraulically operated control elements, enabling the normal functions and operations thereof the same way as conventional separate loading grippers and clamp harvesters.

FIG. 6 illustrates a crosswise jib assembly divided into two jib sections 2a and 2b, said clamp harvester 4 and loading gripper 3 being located on different sides of the actual boom assembly 1. By means of this solution the crosswise jib can be balanced in a relatively simple manner. The crosswise jib is preferably mounted on the pivoting axle 8 in such a manner that the relative angle of different jib sections 2a and 2b can be varied in the longitudinal direction of the crosswise jib. In addition, the jib section 2b extending towards the gripper 1 is provided with a hydraulic cylinder 10 and a pivot joint 9 for swinging the gripper 1 aside when passing the boom 1.

FIGS. 7 and 8 illustrate one embodiment of a cone locking for locking a clamp harvester and/or a loading gripper rigidly relative to the crosswise jib 2a, 2b. FIG. 7 shows the cone locking with the locking on and FIG. 8 with the locking off. This cone locking comprises an operating cylinder 14, fitted inside the jib section 2a, 2b and having a piston 15 provided with a crosswise pin 13 which is fitted in a guide opening 16 included in the jib section 2a, 2b for movement in the longitudinal direction of the opening. To the crosswise pin 13 is journalled a link element 17 to which is in turn journalled a pivoting means 11 by means of a pivoting pin 12, which is substantially perpendicular to the crosswise pin 13 and to which the clamp harvester 4 and/or the loading gripper 3 can be coupled.

I claim:

1. A combined harvesting and transporting machine, comprising a multi-directionally pivotable and extensible boom assembly (1), an axle carried by the outermost end of the boom assembly, a crosswise jib (2) pivotally connected to the outermost end of the boom assembly such that said jib has two ends extending from the outermost end of the boom assembly, one end of the jib carrying a clamp harvester (4) and the other end of the jib carrying a loading gripper (3), and means for selectively pivoting said crosswise jib (2) in its longitudinal direction around the axle such that either end of the crosswise jib may be moved to a working position.

2. A machine as set forth in claim 1, further comprising first locking means for selectively locking the clamp harvester rigidly to the crosswise jib (2).

3. A machine as set forth in claim 2, wherein the first locking means comprises a hydraulically operated locking cone.

4. A machine as set forth in claim 1, wherein the means for selectively pivoting includes a gear (7) mounted on the axle (8), a hydraulic cylinder (5) carried by the boom assembly (1), and a gear rack (6) movably carried by the hydraulic cylinder such that the gear rack engages the gear.

5. A machine as set forth in claim 1, wherein the crosswise jib includes two sections (2a, 2b), each section being located on an opposite side of the boom assembly (1), one jib section (2a) pivotally carrying at the outermost end thereof the clamp harvester (4) and the other jib section (2b) pivotally carrying the loading gripper (3).

6. A machine as set forth in claim 5, wherein the relative angle between the jib sections (2a, 2b) is adjustable in the longitudinal direction of the crosswise jib.

7. A machine as set forth in claim 1, further comprising a second locking means for selectively locking the loading gripper rigidly to the crosswise jib.

8. A machine as set forth in claim 7, wherein said second locking means comprises a hydraulically operated locking cone.

9. A machine as set forth in claim 1, wherein said crosswise jib is pivotable through at least 180 degrees with respect to the boom assembly.

* * * * *